United States Patent [19]

Shamburger

[11] 4,155,071
[45] May 15, 1979

[54] DIGITAL DATA CHANGE-OF-STATE DETECTOR

[75] Inventor: Kenneth H. Shamburger, Montrose, Pa.

[73] Assignee: The Singer Company, Binghamton, N.Y.

[21] Appl. No.: 829,069

[22] Filed: Aug. 30, 1977

[51] Int. Cl.² .............................................. G06F 7/04
[52] U.S. Cl. ............................................... 340/146.2
[58] Field of Search ............... 364/738, 741, 769, 200, 364/900; 340/146.2, 146.1 AL, 146.1 BA

[56] References Cited

U.S. PATENT DOCUMENTS

| | | | |
|---|---|---|---|
| 3,119,987 | 1/1964 | Slavin | 340/146.2 |
| 3,147,343 | 9/1964 | Meyer et al. | 340/146.2 |
| 3,757,306 | 9/1973 | Boone | 364/200 |
| 3,778,775 | 12/1973 | Haring et al. | 364/900 |
| 3,781,792 | 12/1973 | Birkin | 40/146.1 BA |
| 3,789,204 | 1/1974 | Barlow | 340/146.1 AG |
| 3,794,981 | 2/1974 | O'Connor | 364/769 |
| 3,863,215 | 1/1975 | McGrogan, Jr. | 340/146.1 BA |
| 3,931,612 | 1/1976 | Stevens et al. | 364/900 |
| 3,967,246 | 6/1976 | House | 364/900 |

Primary Examiner—Malcolm A. Morrison
Assistant Examiner—Errol A. Krass
Attorney, Agent, or Firm—Ronald Reichman; Jeff Rothenberg

[57] ABSTRACT

This invention relates to electronic circuits that detect changes in digital data that occur on a parallel data bus. The data on the parallel input bus is fed to a memory register. In addition, each data bus is tied to a comparison circuit which compares the input data with the output data on the same bus. If the data is not identical, the comparison circuit changes state to provide a signal which may be used for updating the data.

1 Claim, 1 Drawing Figure

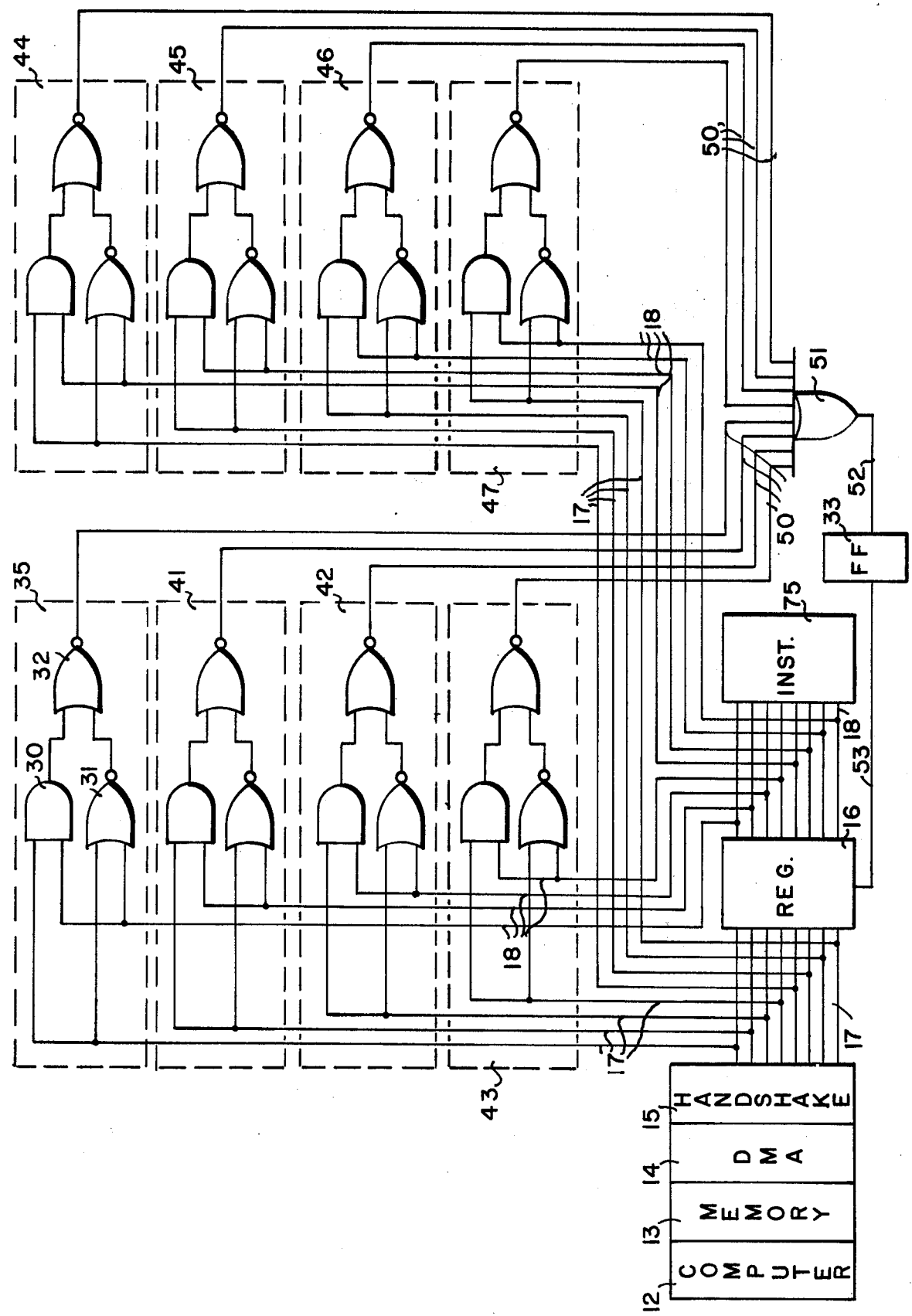

DIGITAL DATA CHANGE-OF-STATE DETECTOR

The United States Government has rights in this invention pursuant to Contract Number F33657-74-C-0322 awarded by the Department of the Air Force.

BACKGROUND OF THE INVENTION

1. Field of the Invention

This invention relates to electronic circuits and, more particularly, to electronic circuits that are used to detect digital data that appears on a parallel data bus.

2. Description of the Prior Art

We perceive a variety of characteristics of the things around us, such as colors, shapes, sizes, etc. These senses have been refined and extended by instruments, such as telescopes, microscopes, etc. Other instruments, such as magnetometers, have been developed in which there is no physiological sense developed in human beings.

Systems controlled by computers are now being used on the factory floor to run machine tools, track the contents of a warehouse, test products and monitor various industrial processes. Sensors contained within the foregoing systems are used to obtain information pertaining to the physical and chemical parameters of the goods being manufactured or produced so that human operators may adjust various instruments to control the quality of what is being produced. The information sensed by the sensors is encoded in the form of electrical signals that can be readily sorted, calculated, processed, converted, decoded and finally displayed on readout devices. Most systems provide for automatic repetitive measurements of the phenomena being sensed. The sensed information is sampled at some predetermined rate before the information is displayed on the readout devices. In order to process and display the desired information, it is necessary to use large computers and control electronics.

SUMMARY OF THE INVENTION

This invention overcomes the disadvantages of the prior art by providing a circuit which detects changes in digital data which occur on a parallel data bus, thus providing for the automatic updating of various systems.

Many systems currently in use require large quantities of information to be sensed, processed and displayed to the operator or operators of the system. An example of a system that requires the sensing and processing of large amounts of information is a flight simulator. A flight simulator used for training purposes generally comprises a fixed station which recreates the environment in which the student will find in the actual airplane. The fixed station may be mounted on a motion system and coupled to a visual system so that the students in the fixed station will experience a realistic flight. The entire simulator is controlled by a digital computer with sufficient speed and capacity for the realtime processing of the data necessary to control the equipment in the fixed station, the motion system and visual systems.

The airplanes being simulated today contain many new and varied instruments which are used by the pilot and/or crew members to yield information on the current condition of the airplane. Computers are used to solve the flight equations which will determine the information that appears on the instruments contained in the flight simulator. If the variables that are contained within the flight equations are not changing, it will not be necessary to solve certain flight equations. Thus, additional instruments may be simulated using the same computer since each flight equation will not have to be calculated each sample rate.

It is an object of this invention to provide a new and improved system for detecting the changing of information.

It is another object of this invention to provide a new and improved system that indicates the presence or absence of a particular state on an input data bus.

It is a further object of this invention to provide a new and improved system for updating memories.

Further objects and advantages of this invention will become more apparent as the following description proceeds, which invention should be considered together with the accompanying drawing.

BRIEF DESCRIPTION OF THE DRAWING

The single FIGURE is a schematic block diagram of apparatus constructed in accordance with the present invention.

DESCRIPTION OF A PREFERRED EMBODIMENT

Referring now to the single drawing in detail, the reference character 12 represents a general purpose digital computer having an external memory 13 which has a direct memory access channel 14. Direct memory access channel 14 is coupled to a handshake control 15 which is coupled to memory register 16.

Computer 12 develops data that will be used for simulating various systems. The data that is developed by computer 12 is stored in memory 13, permitting direct memory access channel 14 and handshake control 15 to directly extract the data stored in memory 13. In order to accomplish the foregoing, handshake control 15 must be synchronous and electrically compatible with direct access channel 14. The data extracted from memory 13 is transmitted via lines 17 to the inputs of register 16. Only one register 16 and eight lines 17 are shown herein since the changing of data for only one instrument will be described. For purposes of this description, it will be assumed that if data bits 0-7 are present on lines 17, instrument 75 will read full scale. Instrument 75 may be any type of gage, meter, etc. Instrument 75 is connected to register 16 via lines 18.

The data being transmitted on lines 17 will be stored in register 16 when a signal called a data strobe is present on line 53. The data strobe signal will only be generated when the data on lines 17 has changed. If the data on lines 17 remains unchanged, the data strobe signal, hereinafter described, will not be generated and a new reading will not appear on instrument 75. If there is new data on lines 17, a data strobe signal will be generated and instrument 75 will display a new value. Thus, it will not be necessary to allocate any memory locations in memory 13 to inform instrument 75 that it is being updated. The act of strobing data into memory register 16 will permit instrument 75 to be updated without computer 12 expending any time for controlling the data transfer process.

The first input to AND gate 30 is coupled to that line 17 that transmits data bit 0 and the second input to gate 30 is connected to that line 18 that transmits data bit 0. The two inputs to NOR gate 31 are one of the lines 17 that transmits data bit 0 and one of the lines 18 that transmits data bit 0. NOR gate 32 has two inputs: the output of AND gate 30 and the output of NOR gate 31. The output of gate 32 is connected to the input of OR gate 51, whose output in turn is connected to the input of monostable flip flop 33 via line 52. The output of monostable flip flop 33 is connected to register 16 via line 53. For ease of description, AND gate 30, NOR gate 31 and NOR gate 32 will be called comparison circuit 35.

Comparison circuits 41-47 contain the same circuitry that was hereinbefore described in comparison circuit 35. The inputs to comparison circuit 41 are the line 17 that transmits data bit 1 and the line 18 that transmits data bit 1. Comparison circuits 42-47 have, respectively, as inputs bit 2 that is transmitted via line 17 and bit 2 that is transmitted via line 18; bit 3 transmitted via line 17 and bit 3 transmitted via line 18; bit 4 transmitted via line 17 and bit 4 transmitted via line 18; bit 5 transmitted via line 17 and bit 5 transmitted via line 18; bit 6 transmitted via line 17 and bit 6 transmitted via line 18; and bit 7 transmitted via line 17 and bit 7 transmitted via line 18. The output of comparison circuits 41-47 are transmitted to the input of OR gate 51 via line 50. A logic 1 on any OR gate 51 input will cause a logic 1 at the input of monostable flip flop 33, and a logic 1 at the input of monostable flip flop 33 will enable flip flop 33, causing a clock pulse to be transmitted to register 16 via line 53.

Since the comparison circuits used for determining the changing of data are the same, only comparison circuit 35 will be described. There are only four possible data conditions that may exist on the input (line 17) of register 16 and on the output of register 16 (line 18).

| Condition | Data Bit 0 May be a Logic (Line 17) | Date Bit 0 May be a Logic (Line 18) | Did Data Change? |
|---|---|---|---|
| 1 | 1 | 1 | No |
| 2 | 1 | 0 | Yes |
| 3 | 0 | 0 | No |
| 4 | 0 | 1 | Yes |

During condition 1, the two inputs to AND gate 30 will be logic 1; hence, AND gate 30 will be enabled and one of the inputs to NOR gate 32 will be a logic 1. The two inputs to NOR gate 31 will also be 1 and the output of gate 31 and the input to gate 32 will be a 0. NOR gate 32 will have a 0 output and monostable flip flop 33 will not be enabled. Hence, a data strobe signal will not be transmitted on line 53 indicating that the data bit 0 that is now being transmitted by computer 12 has the same logic level as the data bit 0 that was previously transmitted by computer 12.

During condition 2, the inputs to AND gate 30 will be a logic 1 and a logic 0. Hence, gate 30 will not be enabled and one of the inputs of NOR gate 32 will be a logic 0. The two inputs to NOR gate 31 will be a logic 1 and a logic 0. The output of gate 31 and the second input to NOR gate 32 will be a logic 0. Gate 32 will have a logic 1 output, causing flip flop 33 to be enabled and a data strobe signal to be transmitted on line 53 indicating that data bit 0 has changed state.

During condition 3, the two inputs to AND gate 30 will be logic 0 and the output of gate 30 will be a logic 0. The inputs to NOR gate 31 will be logic 0 and the output of gate 31 will be a logic 1. The inputs of NOR gate 32 are a logic 0 and a logic 1. Hence, the output of gate 32 will be a logic 0 and monostable flip flop 33 will not be enabled, indicating that data bit 0 has not changed state.

During condition 4, the two inputs to AND gate 30 will be a logic 0 and a logic 1. The output of gate 30 will be a logic 0 and one of the inputs of NOR gate 32 will be a logic 0. The inputs of NOR gate 31 will be a logic 0 and a logic 1 and the output of gate 31 will be a logic 0. NOR gate 32 will have two logic 0 inputs and its output will be a logic 1. Thus, monostable flip flop 33 will be enabled and a data strobe signal transmitted on line 53, indicating that data bit 0 has changed state.

Comparison circuits 35 and 41-47 are connected in parallel via OR gate 51 so that if one of the data bits (0-7) change state, a data strobe signal will be transmitted on line 53.

The above specification describes a new and improved device for detecting when digital data changes state. It is realized that the above description may indicate to those skilled in the art additional ways in which the principles of this invention may be used without departing from its spirit. It is, therefore, intended that this invention be limited only by the scope of the appended claims.

What is claimed is:

1. An electronic circuit that detects changes in digital data that occurs on a parallel data bus, said electronic circuit comprising:
   a. a memory register that stores digital data that enters said register on parallel lines, and exits said register on parallel lines when said register receives a strobe input;
   b. a plurality of comparison means connected in parallel and coupled to said memory register, each one of said parallel lines being coupled to a different said comparison means for comparing the input and output data that enters and exits said memory register; each of said comparison means comprises:
   an AND gate whose inputs are coupled to a parallel input of said memory register and a parallel output of said register;
   a first NOR gate whose inputs are coupled to said parallel input of said memory register and said parallel output of said register; and
   a second NOR gate whose inputs are coupled to the output of said AND gate and the output of said first NOR gate;
   c. an OR gate whose input is coupled to the output of each of said second NOR gates; and
   d. a monostable flip flop whose input is coupled to the output of said OR gate and whose output is coupled to the strobe input of said register, whereby if the input digital data to said register is different from the output digital data of said register one or more of said comparison means will generate a signal causing the data on the inputs of said register to be stored in said register, signifying that the data has changed state.

* * * * *